(12) United States Patent
Lin

(10) Patent No.: US 9,103,996 B2
(45) Date of Patent: Aug. 11, 2015

(54) OPTICAL FIBER CONNECTOR WITH HANDLING MEMBER

(71) Applicant: Yu-Ching Lin, Kaohsiung (TW)

(72) Inventor: Yu-Ching Lin, Kaohsiung (TW)

(*) Notice: Subject to any disclaimer, the term of this patent is extended or adjusted under 35 U.S.C. 154(b) by 0 days.

(21) Appl. No.: 14/267,117

(22) Filed: May 1, 2014

(65) Prior Publication Data

US 2015/0078717 A1    Mar. 19, 2015

(30) Foreign Application Priority Data

Sep. 18, 2013  (TW) .............................. 102134048 A

(51) Int. Cl.
*G02B 6/00* (2006.01)
*G02B 6/38* (2006.01)
*G02B 6/42* (2006.01)

(52) U.S. Cl.
CPC .............. *G02B 6/3898* (2013.01); *G02B 6/389* (2013.01); *G02B 6/4261* (2013.01); *Y10T 29/49947* (2015.01)

(58) Field of Classification Search
CPC .... G02B 6/3898; G02B 6/389; G02B 6/4261; Y10T 29/49947
USPC .......................... 385/53, 77, 134; 29/525.01
See application file for complete search history.

(56) References Cited

U.S. PATENT DOCUMENTS

| | | | | |
|---|---|---|---|---|
| 2,867,449 | A * | 1/1959 | Shawver ..................... 280/47.18 |
| 5,813,096 | A * | 9/1998 | Soennichsen ................. 411/509 |
| 6,267,606 | B1 * | 7/2001 | Poplawski et al. ............. 439/92 |
| 6,746,158 | B2 * | 6/2004 | Merrick ........................... 385/53 |
| 6,785,460 | B2 * | 8/2004 | de Jong et al. ................ 385/134 |
| 7,020,376 | B1 * | 3/2006 | Dang et al. ..................... 385/135 |
| 7,201,520 | B2 * | 4/2007 | Mizue et al. ..................... 385/92 |
| 7,297,013 | B2 * | 11/2007 | Caveney et al. .............. 439/352 |
| 7,322,753 | B2 * | 1/2008 | Mizue et al. ..................... 385/92 |
| 8,308,377 | B2 * | 11/2012 | Yi ................................... 385/92 |
| 8,391,667 | B2 * | 3/2013 | Teo et al. ....................... 385/139 |
| 8,559,781 | B2 * | 10/2013 | Childers et al. ............... 385/134 |
| 8,727,801 | B2 * | 5/2014 | Szczesny ...................... 439/352 |
| 8,855,458 | B2 * | 10/2014 | Belenkiy et al. .............. 385/137 |
| 2002/0008125 | A1 * | 1/2002 | Caputi ........................... 224/257 |
| 2002/0009905 | A1 * | 1/2002 | Poplawski et al. ........... 439/76.1 |
| 2003/0142917 | A1 * | 7/2003 | Merrick .......................... 385/53 |
| 2004/0101265 | A1 * | 5/2004 | Jong et al. ..................... 385/134 |
| 2005/0018979 | A1 * | 1/2005 | Mizue et al. ..................... 385/92 |
| 2005/0148223 | A1 * | 7/2005 | Shirk et al. .................... 439/160 |
| 2005/0276560 | A1 * | 12/2005 | Reinert et al. ................. 385/134 |
| 2007/0041687 | A1 * | 2/2007 | Mizue et al. ..................... 385/92 |
| 2009/0185071 | A1 * | 7/2009 | Suzuki et al. ................. 348/375 |
| 2009/0226140 | A1 * | 9/2009 | Belenkiy et al. .............. 385/134 |
| 2011/0019962 | A1 * | 1/2011 | Childers et al. ................. 385/76 |
| 2011/0080008 | A1 * | 4/2011 | Teo et al. ....................... 292/197 |
| 2012/0018652 | A1 * | 1/2012 | Yoder et al. ................. 250/484.2 |
| 2012/0027362 | A1 * | 2/2012 | Yi ................................... 385/92 |
| 2012/0237288 | A1 * | 9/2012 | Sczesny .................... 403/322.4 |
| 2013/0178090 | A1 * | 7/2013 | Teo et al. ....................... 439/350 |
| 2013/0183004 | A1 * | 7/2013 | Hughes et al. .................. 385/77 |
| 2013/0216188 | A1 | 8/2013 | Lin et al. |
| 2014/0126957 | A1 * | 5/2014 | Shi et al. ..................... 403/322.1 |

* cited by examiner

*Primary Examiner* — Peter Radkowski
(74) *Attorney, Agent, or Firm* — Rosenberg, Klein & Lee

(57) ABSTRACT

An optical fiber connector according to the present disclosure includes an outer housing, an inner housing and a handling member. The outer housing has an accommodation room defined by a first wall, a second wall, a third wall and a fourth wall, wherein the first wall faces the third wall and connects with the second and fourth walls. A hook is formed at each of the second and fourth walls. The inner housing protrudes outwardly from the accommodation room of the outer housing. The handling member has a pair of grip hooks that are configured to hook on to the hooks at the second and fourth walls, respectively.

6 Claims, 6 Drawing Sheets

US 9,103,996 B2

OPTICAL FIBER CONNECTOR WITH HANDLING MEMBER

RELATED APPLICATION

The present application is based on and claims priority to Taiwanese Application No. 102134048, filed Sep. 18, 2013, the disclosure of which is hereby incorporated by reference herein in its entirety.

Background

1. Technical Field

The disclosure relates to an optical fiber connector, and more particularly, to an optical fiber connector with a handling member.

2. Description of the Related Art

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (herein "mating device"). This way, the light from one fiber is optically coupled to the optical path of the mating device.

A typical connector comprises a housing containing a ferrule which holds one or more fibers. The ferrule is biased forward in the housing such that, when the connector is mated to the mating device, the fiber in the ferrule urges against the optical path of the mating device. There are many different prior art connectors currently available for establishing such optical connections, including, for example, SC, ST and FC connectors and more-recent "small form factor" designs such as MTRJ, MU, LC, MPX and MPO-type connectors.

Referring to FIG. 1, it illustrates conventional MPO type multi-fiber connectors 110, 110' and the corresponding optical fiber adapter 160 thereof. The connector 110 has guide pins 112 protruding from the front end thereof and the connector 110' has corresponding holes 112' located on the front end thereof. When the connectors 110, 110' couple with each other through the adapter 160, the guide pins 112 will be inserted into the holes 112' and the hooks 162 in the adapter 160 will hook on two recesses 114 of the connector 110 and two recesses 114' of the connector 110', respectively. At this time, the ferrule 118 of the connector 110 will be brought into contact with the ferrule 118' of the connector 110'.

However, when many the connectors 110, 110' are mounted on a panel with close spacing to each other, it is likely that there is no enough space for a user's fingers to pull out the connectors 110, 110'.

Accordingly, there exists a need to provide a solution to solve the aforesaid problems.

SUMMARY

The present disclosure provides an optical fiber connector with a handling member, wherein a pull at the handling member may pull out the optical fiber connector from an optical fiber adapter without need to pull the optical fiber connector directly.

In one embodiment, the optical fiber connector according to the present disclosure includes an outer housing, an inner housing and a handling member. The outer housing has an accommodation room defined by a first wall, a second wall, a third wall and a fourth wall, wherein the first wall faces the third wall and connects with the second and fourth walls. A hook is formed at each of the second and fourth walls. The inner housing protrudes outwardly from the accommodation room of the outer housing. The handling member has a pair of grip hooks that are configured to hook on to the hooks at the second and fourth walls, respectively.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
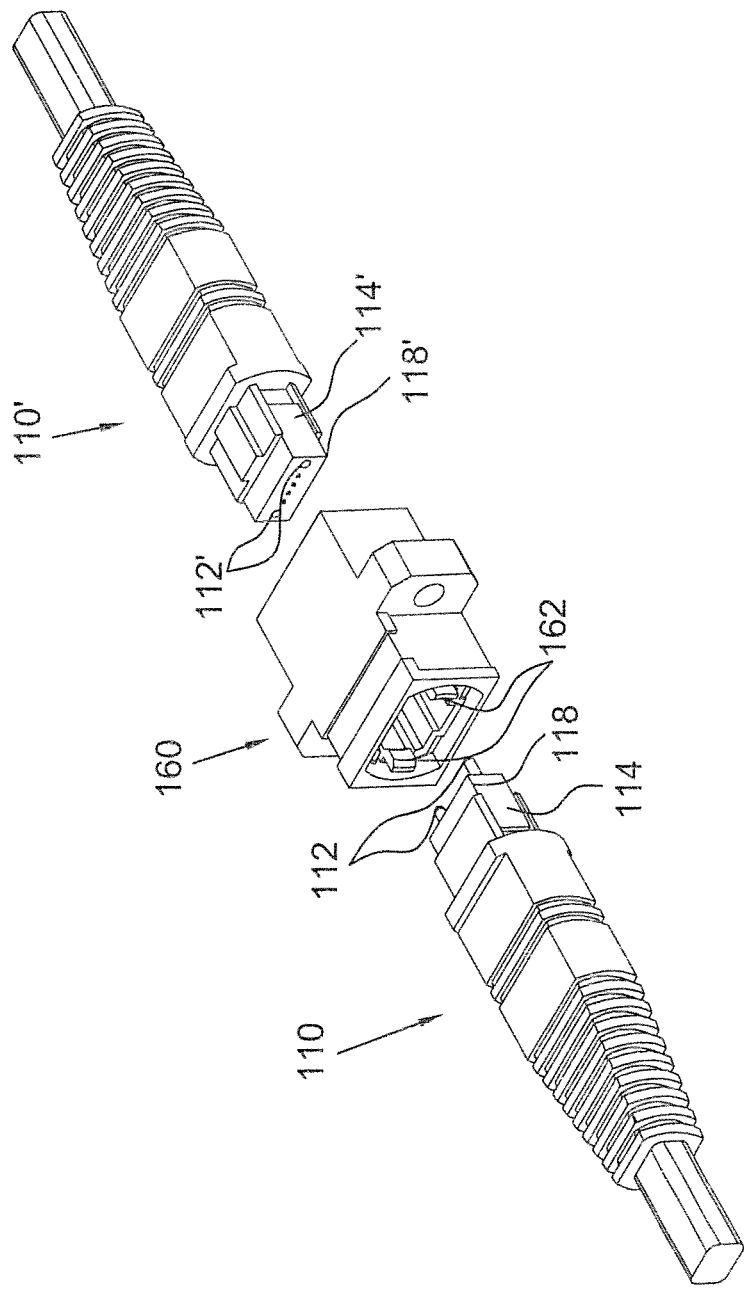
FIG. 1 is an elevated perspective view of a conventional MPO type optical fiber connector and adapter.
Figure 2:
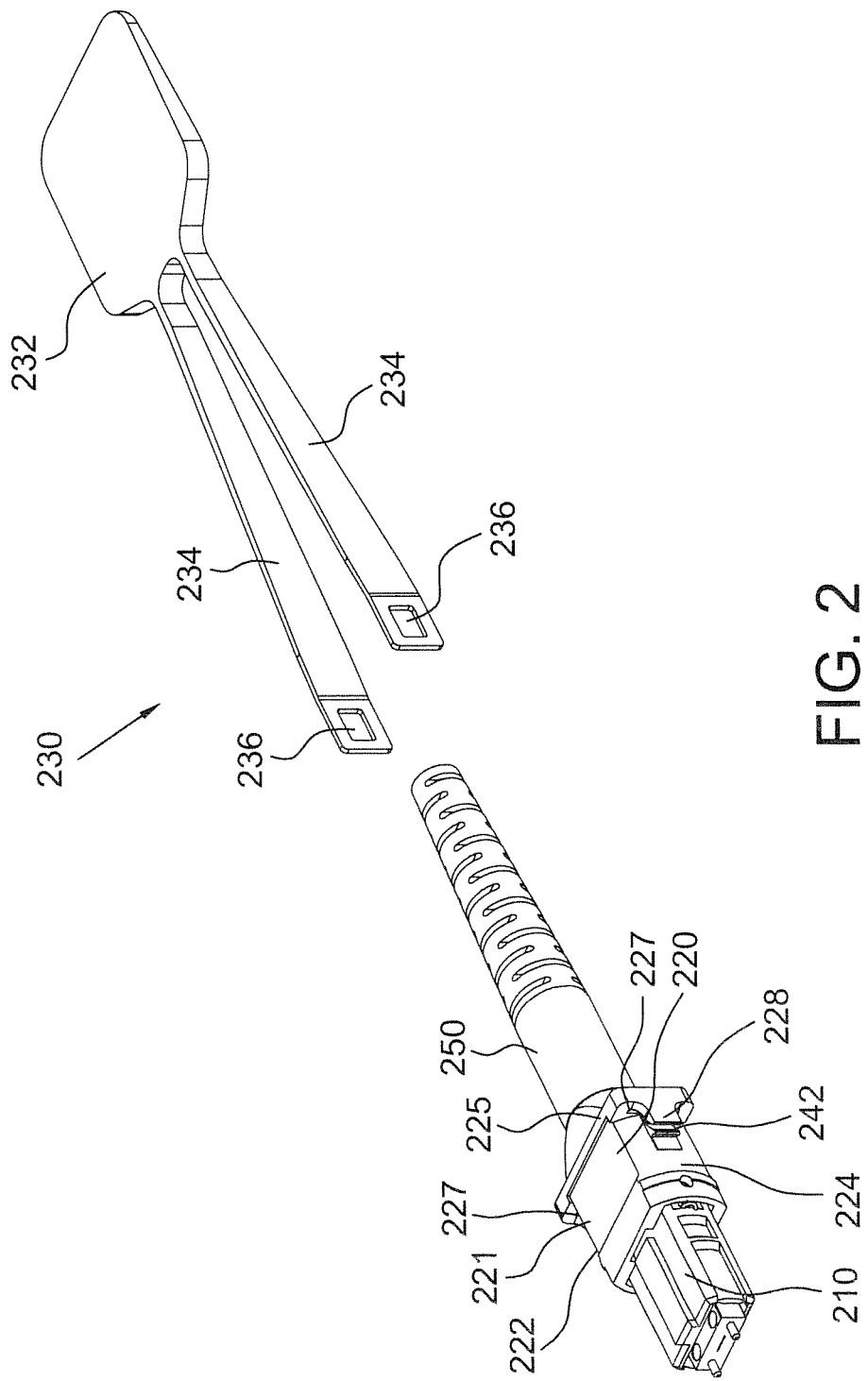
FIG. 2 is an elevated perspective view of the optical fiber connector of the present disclosure, wherein the handling member is separated from the outer housing.
Figure 3:
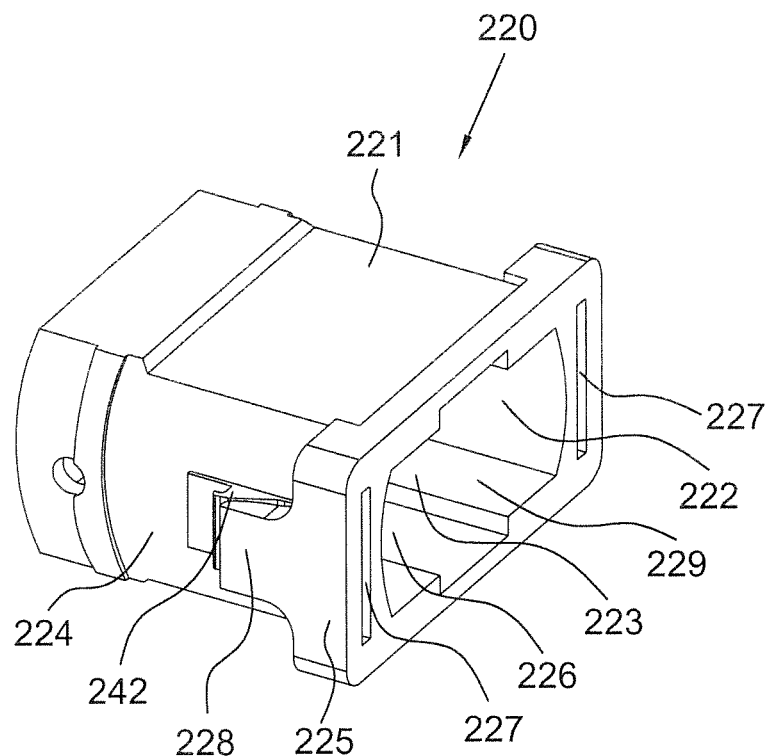
FIG. 3 is an elevated perspective view of the outer housing of the optical fiber connector of the present disclosure.
Figure 4:
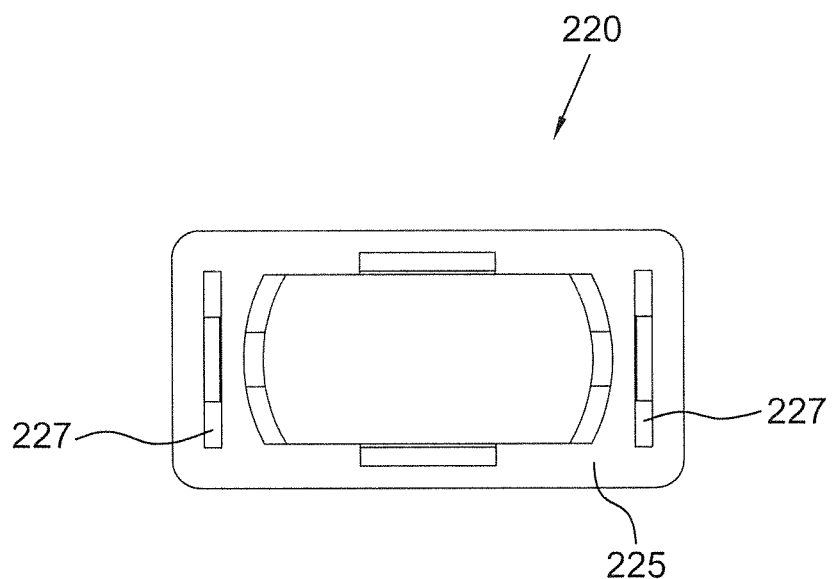
FIG. 4 is a rear view of the outer housing of the optical fiber connector of the present disclosure.
Figure 5:
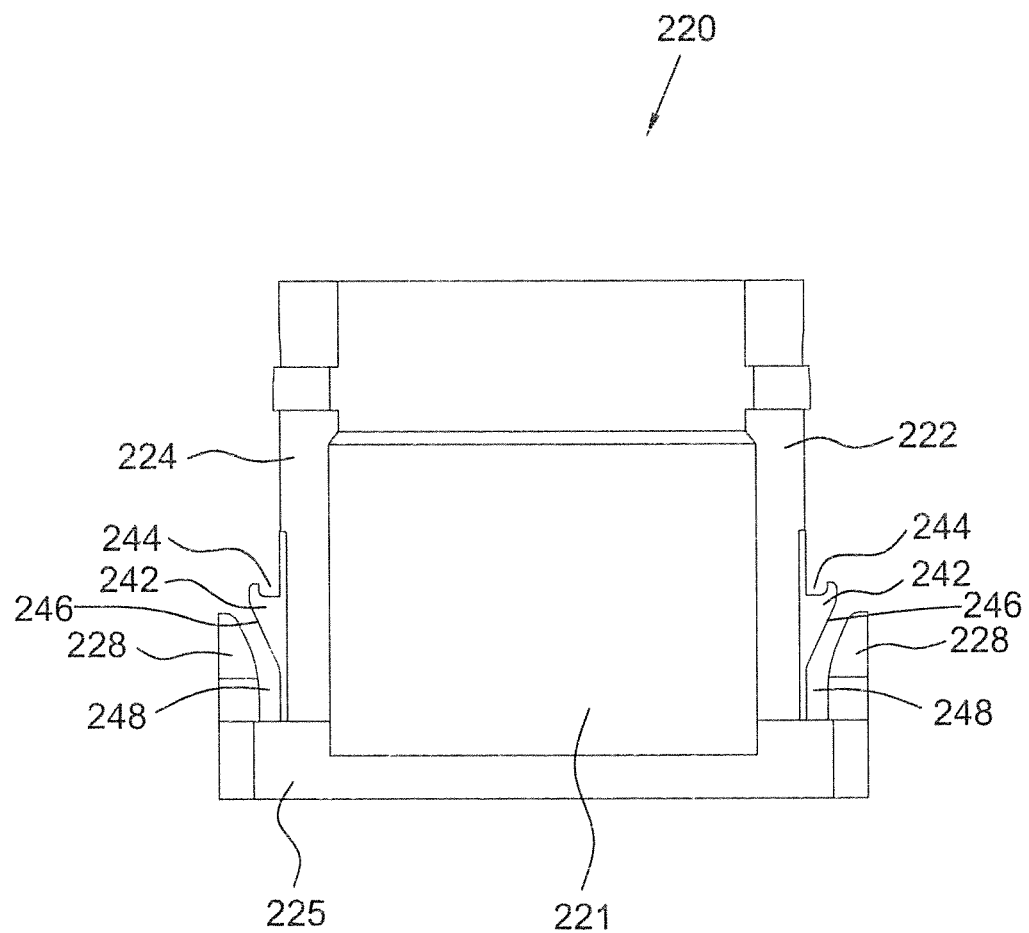
FIG. 5 is a side view of the outer housing of the optical fiber connector of the present disclosure.

Referring to FIGS. 2 to 7, the optical fiber connector according to the present disclosure may be a MPO type optical fiber connector and includes an inner housing 210, an outer housing 220 and a handling member 230. The handling member 230 has a plate-like handle 232. A pair of elongated grip-hooks 234 extends from a side of the handle 232 and is separated gradually from each other. Two rectangular openings 236 are formed at the front ends of the grip hooks 234 respectively and are positioned to face each other.

The outer housing 220 is substantially rectangular and has an accommodation room 226 defined by a first wall 221, a second wall 222, a third wall 223 and a fourth wall 224, wherein the first wall 221 faces the third wall 223 and connects with the second and fourth walls 222, 224. The walls 221, 222, 223 and 224 extend from a hollow flange 225. The inner housing 210 protrudes outwardly from the accommodation room 226 of the outer housing 220 and a hollow boot 250 is connected to the rear end of the inner housing 210. The flange 225 is substantially rectangular and has an opening 229 through which the inner housing 210 may insert into the accommodation room 226 and protrude from the front end of the outer housing 220. Two protrusions 228 are formed at the opposing sides of the flange 225 and face the second wall 222 and fourth wall 224, respectively. Two parallel slits 227 are formed at the flange 225, wherein one slit 227 is arranged between one protrusion 228 and the second wall 222, the other slit 227 is arranged between the other protrusion 228 and the fourth wall 224. In addition, two hooks 242 are positioned at the second and fourth walls 222, 224 and are arranged to face the protrusions 228, respectively. The hooks 242 have inclined outer walls 246 that are curved toward the protrusions 228, respectively. Therefore, two curved passages 248 are formed between the hooks 242 and protrusions 228, respectively. An indentation 244 is formed at each of the hooks 242.

Figure 6:
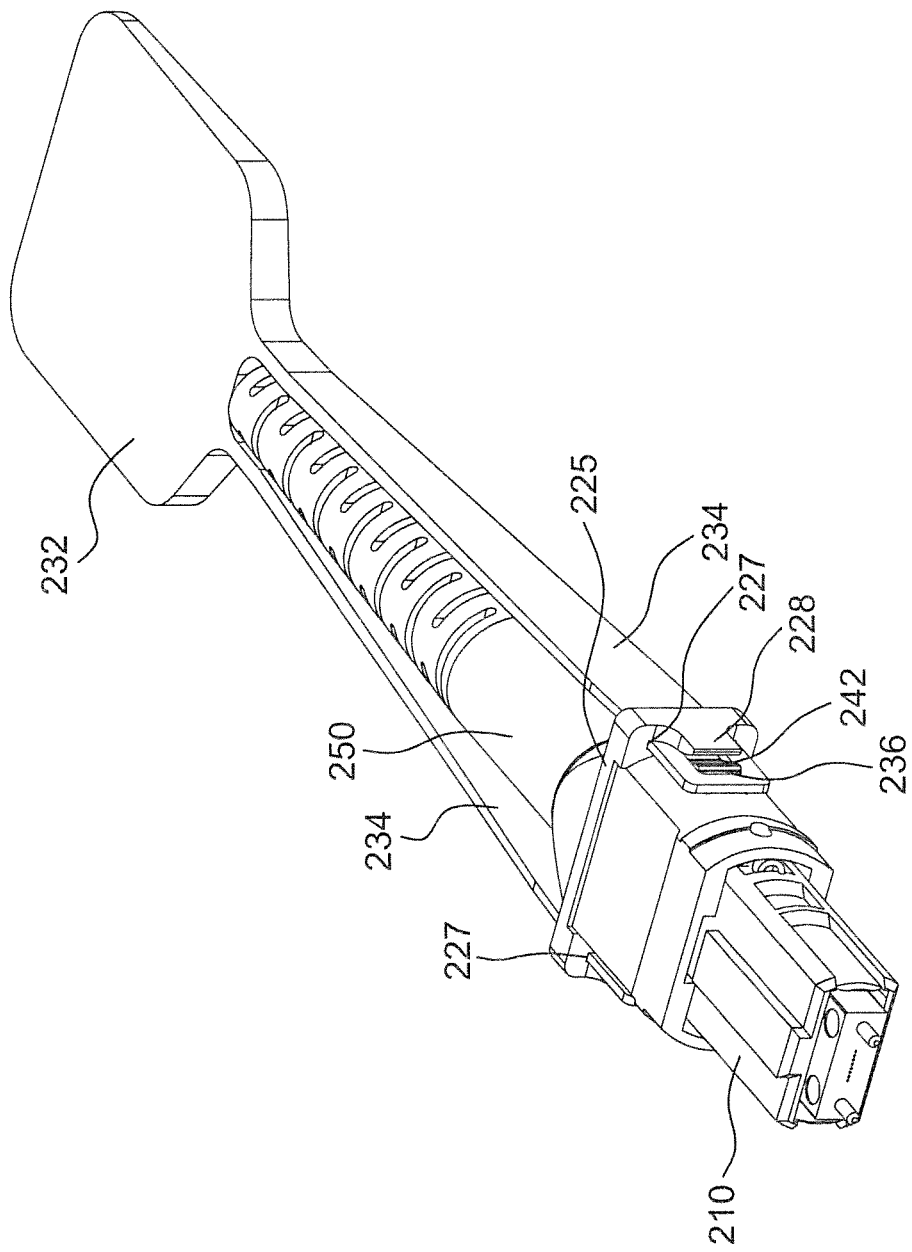
FIG. 6 is an elevated perspective view of the optical fiber connector of the present disclosure.
Figure 7:
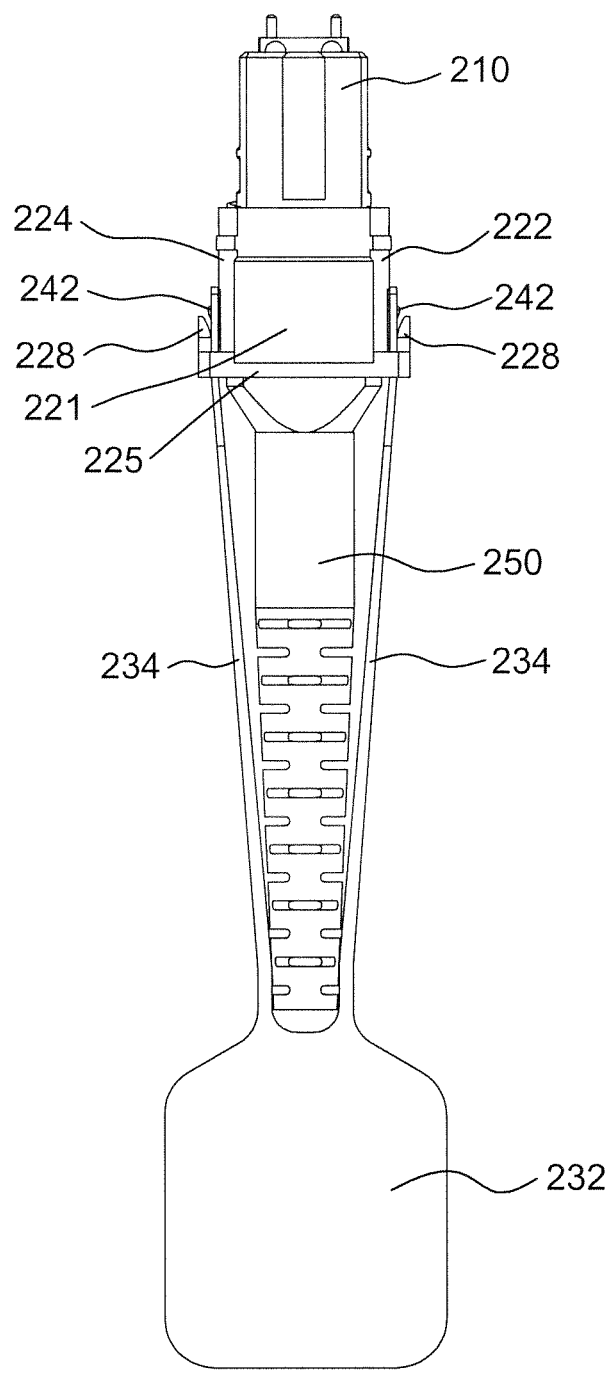
FIG. 7 is a side view of the optical fiber connector of the present disclosure.

When desiring to mount the handling member 230 to the outer housing 220, the grip hooks 234 are inserted through the slits 227 and are pushed to go through the passages 248, respectively. Since the hooks 242 are arranged to curve toward the protrusions 228, the front ends of the grip hooks 234 will move and slide on the outer walls 246 of the hooks 242, respectively when the grip hooks 234 are pushed to go through the passages 248. Finally, the hooks 242 will insert into the openings 236 at the grip hooks 234, respectively, as shown in FIG. 6. This way the handling member 230 will hook on to the outer housing 220.

According to the present disclosure, a user may hold and pull at the handle 232 when the optical fiber connector of the present disclosure is mated with an optical fiber adapter, for example, the optical fiber adapter 160 of FIG. 1. Since the hooks 242 insert into the openings 236 at the grip hooks 234, the hooks 242 will be in contact with inner walls of the openings 236 when the handling member 230 is pulled. This way the optical fiber connector of the present disclosure may be pulled out from an optical fiber adapter without need to pull the optical fiber connector directly. According to the present disclosure, the indentations 244 of the hooks 242 may restrict the movement of the grip-hooks 234 so that the grip-hooks 234 will not slide out from the indentations 244 when the handling member 230 is pulled.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber connector, comprising:
    an outer housing having an accommodation room defined by a first wall, a second wall, a third wall and a fourth wall, the first wall facing the third wall and connecting with the second and fourth walls;
    a hook formed at each of the second and fourth walls, each hook defining a ramped outer surface extending away from a rear end of the accommodation room of the outer housing;
    an inner housing protruding from a front end of the accommodation room of the outer housing; and
    a handling member having a pair of grip hooks extending from a handle, wherein each of the grip hooks slidably engages a ramped outer surface to be guided thereby into locking engagement of a hook of the outer housing.

2. The optical fiber connector as claimed in claim 1, wherein the outer housing further comprising:
    a flange, wherein the first, second, third and fourth walls extend from the flange, the flange has two slits for receiving the grip hooks, respectively.

3. The optical fiber connector as claimed in claim 1, wherein the grip hooks has two openings for receiving the hooks at the outer housing, respectively.

4. The optical fiber connector as claimed in claim 2, wherein the outer housing further comprising:
    two protrusions formed at opposing sides of the flange to face the ramps respectively, and thereby forming two curved passages between the protrusions and the opposing ramps to guide the movement of the grips hooks.

5. The optical fiber connector as claimed in claim 3, wherein two indentations are formed at the hooks of the outer housing for being in contact with inner walls of the openings, respectively.

6. The optical fiber connector as claimed in claim 1, wherein the optical fiber connector is a MPO type optical fiber connector.

\* \* \* \* \*